United States Patent [19]

Kuhn

[11] 4,441,306

[45] Apr. 10, 1984

[54] IMPLEMENT WORKING HEIGHT-ADJUSTMENT MECHANISM

[75] Inventor: John B. Kuhn, Mayville, Wis.

[73] Assignee: Deere & Company, Moline, Ill.

[21] Appl. No.: 413,910

[22] Filed: Sep. 1, 1982

[51] Int. Cl.³ .............................................. A01D 35/26
[52] U.S. Cl. ..................................... 56/15.9; 56/17.1; 56/DIG. 22
[58] Field of Search ............... 56/15.1, 15.2, 15.8, 56/15.9, 17.1, 13.6, 15.3, 16.3, DIG. 22

[56] References Cited

U.S. PATENT DOCUMENTS 3,757,596  9/1973  McCanse ........................... 74/491
4,102,114  7/1978  Estes et al. ...................... 56/DIG. 22

Primary Examiner—Jay N. Eskovitz

[57] ABSTRACT

A vehicle includes hydraulically actuated lift arms which are pivotally connected to central locations of the top of a mower blade housing and are operative for moving the mower vertically between working and transport positions. When the mower is in its working position, a pair of caster wheels suppports the front of the blade housing while the rear of the housing is supported from the lift arms by a pair of suspension assemblies. Each of the suspension assemblies includes a fore-and-aft extending adjuster screw which is operable for effecting selected fore-and-aft movement of an adjuster bracket, which is connected to an associated lift arm by a chain, so as to cause the rear end of the housing to be adjusted vertically. These suspension assemblies cooperate with adjustment mechanisms associated with the caster wheels to place the mower at different cutting heights.

6 Claims, 4 Drawing Figures

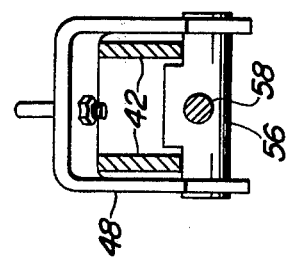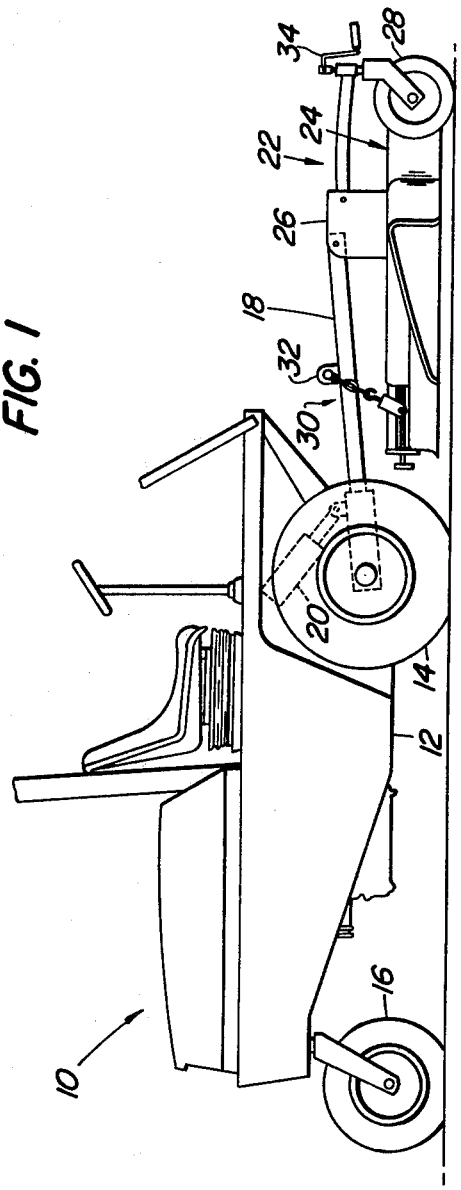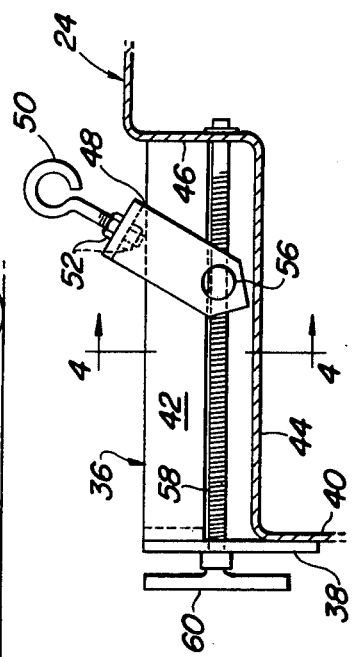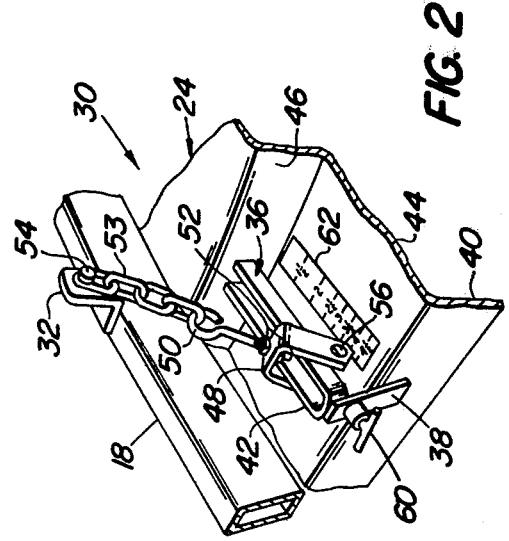

IMPLEMENT WORKING HEIGHT-ADJUSTMENT MECHANISM

BACKGROUND OF THE INVENTION

This invention relates to tractor-mounted implements having mechanisms for selectively placing work elements thereof at different working heights.

It is known in the art to provide tractor-mounted implements, such as mowers, for example, which have one end supported by a set of vertically adjustable ground wheels and a second end supported from the tractor by linkage which incorporates or has associated therewith a height-adjustment mechanism. U.S. Pat. Nos. 3,757,596 issued to McCanse on Feb. 18, 1972 and 4,102,114 issued to Estes et al. on July 25, 1978 disclose examples of mowers of this type.

The known height-adjustment mechanisms are not entirely satisfactory as they often include relatively long levers which must be swung through an arc to effect adjustment and thus lack compactness and simplicity.

SUMMARY OF THE INVENTION

According to the present invention there is provided an adjustment mechanism for adjusting an end of an implement vertically so as to vary the working height of work elements of the implement.

The present invention is shown as being embodied in a front mounted rotary mower having a blade housing supported at its forward end by a pair of caster wheels and supported at its rearward end by a tractor through means of a pair of lift arms. Connected between each lift arm and the mower housing is an adjustment mechanism including bracketry fixed to a rear end portion of the housing and rotatably supporting a long adjuster screw in a horizontal fore-and-aft extending disposition. A length of chain is interconnected between a lug fixed to the lift arm and a bracket pivotally receiving opposite ends of a pivot pin in which the adjuster screw is threadedly received. Turning of the screw one way or the other then results in the bracket moving fore-and-aft relative to the fixed lug such that the rear end of the housing is selectively raised or lowered.

It is an object of the invention to provide a simple, relatively compact height-adjustment mechanism for selectively varying the working height of one end of a tractor-mounted implement.

A more specific object is to provide a height-adjustment mechanism for effecting selected linear, horizontal movement of an adjustment bracket which is connected by a length of chain to a lug fixed to an arm extending between the tractor and the implement.

Yet another object is to provide a height-adjustment mechanism, as set forth in the immediately preceding object, which includes an adjustment for changing the effective length of the length of chain.

A further object of the invention is to provide a tractor-mounted implement with a height-adjustment mechanism including a linearly movable bracket formed to define a pointer which is so arranged relative to indicia placed on the implement that the height of the implement may be easily determined for each position of the bracket.

These and other objects will become apparent from a reading of the ensuing description together with the appended drawings.

BRIEF DESCRIPTION OF THE DRAWINGS

FIG. 1 is a right side elevational view of a tractor-mounted mower having one end thereof supported in accordance with the present invention.

FIG. 2 is a right rear perspective view showing the adjustable mower support mechanism of the present invention.

FIG. 3 is a right side elevational view showing the adjuster bracket and the connection of the adjuster screw with the bracket.

FIG. 4 is a view taken along line 4—4 of FIG. 3.

DESCRIPTION OF THE PREFERRED EMBODIMENT

Preliminarily, it is to be noted that various elements are herein described as being in pairs; however, only one of each pair appears in the drawing.

Referring now to FIG. 1, a vehicle 10 of a tricycle type is shown having a frame 12 supported by a pair of forward drive wheels 14 and a rear caster wheel 16. A pair of lift arms 18 is vertically pivotally mounted to the frame along the axis of rotation of the front wheels, and connected between the frame and each of the lift arms is a hydraulic lift actuator 20 which is operable to selectively raise and lower the arms.

An implement here shown as a mower 22 is connected to the lift arms 18. Specifically, the mower 22 includes a blade housing or deck 24 having a pair of lugs 26 fixed to central top locations thereof, and the forward ends of the lift arms are pivotally connected to the lugs. The lift arms 18 are here shown in a lowered position with the mower being shown in a corresponding working position wherein the housing 24 is supported in a level condition by a pair of forward caster wheels 18 and a pair of suspension assemblies 30 respectively connected between respective lugs 32 formed on the lift arms 18 intermediate the opposite ends of the latter and rearward locations of the housing. The caster wheels 28 are each provided with a mechanism 34 for effecting vertical adjustment of the latter so as to change the height of the forward end of the housing. The details of the mechanism 34 are not pertinent to the present invention and are omitted for brevity. The suspension assemblies 30 are adjustable, in a manner to be presently described, to change the height of the rearward end of the housing and they cooperate with the mechanisms 34 to provide selective adjustment of the cutting height of the mower.

Referring now to FIGS. 2–4, it can be seen that each of the suspension assemblies 30 includes a guide bracket 36 comprising a vertical strap 38 fixed to the rear of a vertical skirt portion 40 of the housing and having an upper end portion fixed to the bight portion of an elongate U-shaped strap 42 disposed horizontally above a rear horizontal surface portion 44 of the housing, with forward ends of the legs of the U-shaped strap being fixed to a vertically stepped portion 46 of the housing. A U-shaped height-adjuster bracket 48 is positioned on the guide bracket 36 with its bight portion overlying and its opposite legs extending beside the opposite legs of the U-shaped strap 42. An eyebolt 50 has a threaded end portion received in an opening provided centrally in the bight of the bracket 48, and nuts 52 releasably secure the eyebolt to the bracket at a selected effective length for a purpose to be presently described. A length of chain 53 has one end connected to the eye of the eyebolt 50 and has another end connected to the lug 32 by a pin 54. A pivot pin 56 extends beneath the U-shaped strap 42 of the guide bracket 36 and has opposite ends pivotally received in openings provided in the opposite legs of the adjuster bracket 48 and thus retains the latter for movement along the strap 42. The opposite ends of the pin 56 are provided with flats which are disposed in engagement with the opposite legs of the strap such that the linkage thus formed by the chain 53, eyebolt 50, bracket 48 and pin 56 supports the rear end of the mower blade housing 24 from the lift arm 18. The bracket 48 is held in selected positions along the U-shaped strap 42 by means of an adjusting screw 58 which is rotatably supported by the vertical strap 38 and the stepped housing wall portion 46 and is threadedly received in an opening provided in the pivot pin 56. The screw 58 has a head formed by a handle 60 which may be grasped by the operator and selectively turned to effect either forward or rearward movement of the adjuster bracket to thereby respectively effect lowering and raising of the rear end of the mower blade housing 24. The operator is aided in this adjustment by indicia printed on a decal 62 fixed to the mower housing surface portion 44 beneath the path of movement of one of the legs of the adjuster bracket 48, the latter having the free ends of its opposite legs tapered such that that leg which is located above the decal acts as a pointer. With the pointer indicating a given cutting height on the decal 62 and with a similar height being indicated on a decal (not shown) associated with the mechanism for adjusting the front caster wheels, the blade housing 24 can be leveled by adjusting the effective length of the eyebolt 50.

I claim:

1. In a mower blade housing and support therefor wherein the housing has one end supported by at least one vertically adjustable ground-engaging element and an opposite end suspended from at least one support member extending thereabove, an improved assembly for suspending said opposite end comprising: a lug fixed to one of said support member and said housing; a linear adjustment means fixed to another one of said support member and said housing; a first bracket connected to said linear adjustment means and the latter being selectively operable for moving the bracket relative to said lug; and link means connected between the lug and first bracket for causing said opposite end of the housing to be raised and lowered respectively in response to the linear adjustment means being operated for moving the first bracket away from and towards said lug.

2. The mower blade housing and support therefor defined in claim 1 wherein said linear adjustment means is fixed to the housing and said lug is fixed to said support member.

3. The mower blade housing and support therefor defined in claim 2 wherein said adjustment means includes a second bracket fixed to the housing, an elongate screw rotatably mounted in the second bracket and a swivel member threaded onto said screw; and said first bracket being pivotally mounted on said swivel member.

4. The mower blade housing and support therefor defined in claim 3 wherein said screw extends generally parallel to a top wall portion of the housing; said first bracket being formed to define a pointer directed toward said top wall; and indicia affixed to the top wall, so as to be beneath the path of movement of the pointer as the first bracket is adjusted relative to the lug, and being calibrated to indicate the cutting height of the mower blade housing for each position of the first bracket.

5. The mower blade housing and support therefor defined in claim 3 wherein said first bracket is U-shaped and has opposite legs pivotally mounted to opposite ends of said swivel member; and said link means includes an eyebolt fixed to a bight portion of the first bracket and a length of chain having opposite ends connected to the lug and the eyebolt.

6. The mower blade housing and support therefor defined in claim 5 wherein said second bracket includes a guide portion extending between said opposite legs of the first bracket and above said swivel member.

* * * * *